United States Patent [19]

Mitchell

[11] Patent Number: 5,320,904
[45] Date of Patent: Jun. 14, 1994

[54] REDUCTION OF HYDROGEN GENERATION BY SILICONE-COATED OPTICAL FIBERS

[75] Inventor: Tyrone D. Mitchell, Corning, N.Y.
[73] Assignee: Corning Incorporated, Corning, N.Y.
[21] Appl. No.: 743,710
[22] Filed: Aug. 12, 1991
[51] Int. Cl.$^5$ .............................................. D02G 3/00
[52] U.S. Cl. .................................... 428/378; 385/128; 427/163; 427/165; 427/340; 427/387; 428/447
[58] Field of Search ............... 427/163, 165, 166, 167, 427/168, 169, 335, 340, 342, 387; 385/128; 428/378, 447

[56] References Cited

U.S. PATENT DOCUMENTS

| | | | |
|---|---|---|---|
| 4,384,013 | 5/1983 | Noren | 427/340 X |
| 4,526,953 | 7/1985 | Dallavia | 528/15 |
| 4,679,899 | 7/1987 | Kobayashi | 350/96.30 |
| 4,688,889 | 8/1987 | Pasini | 350/96.23 |
| 4,689,248 | 8/1987 | Traver | 427/168 |
| 4,765,713 | 8/1988 | Matsuo | 350/96.34 |
| 4,848,869 | 7/1989 | Urruti | 350/96.33 |
| 4,877,306 | 10/1989 | Kar | 350/96.33 |
| 4,962,996 | 10/1990 | Cuellar | 350/96.34 |

FOREIGN PATENT DOCUMENTS 0204160 12/1986 European Pat. Off. .

Primary Examiner—Michael Lusignan
Attorney, Agent, or Firm—K. McNeill Taylor, Jr.

[57] ABSTRACT

The deleterious generation of hydrogen in optical fiber cables with cured silicone resin coatings is reduced by treating such optical fibers with one or more type of olefinic hydrocarbon to convert —Si—H groups remaining after curing to —Si—R groups where R is an alkyl group having the same number of carbons as the one or more type of olefinic hydrocarbon. The resulting optical fiber cable, having a light transmissive core surrounded by one or more glass cladding layers, is coated by a cured, silicone polymer having few, if any, residual —Si—H groups.

15 Claims, 1 Drawing Sheet

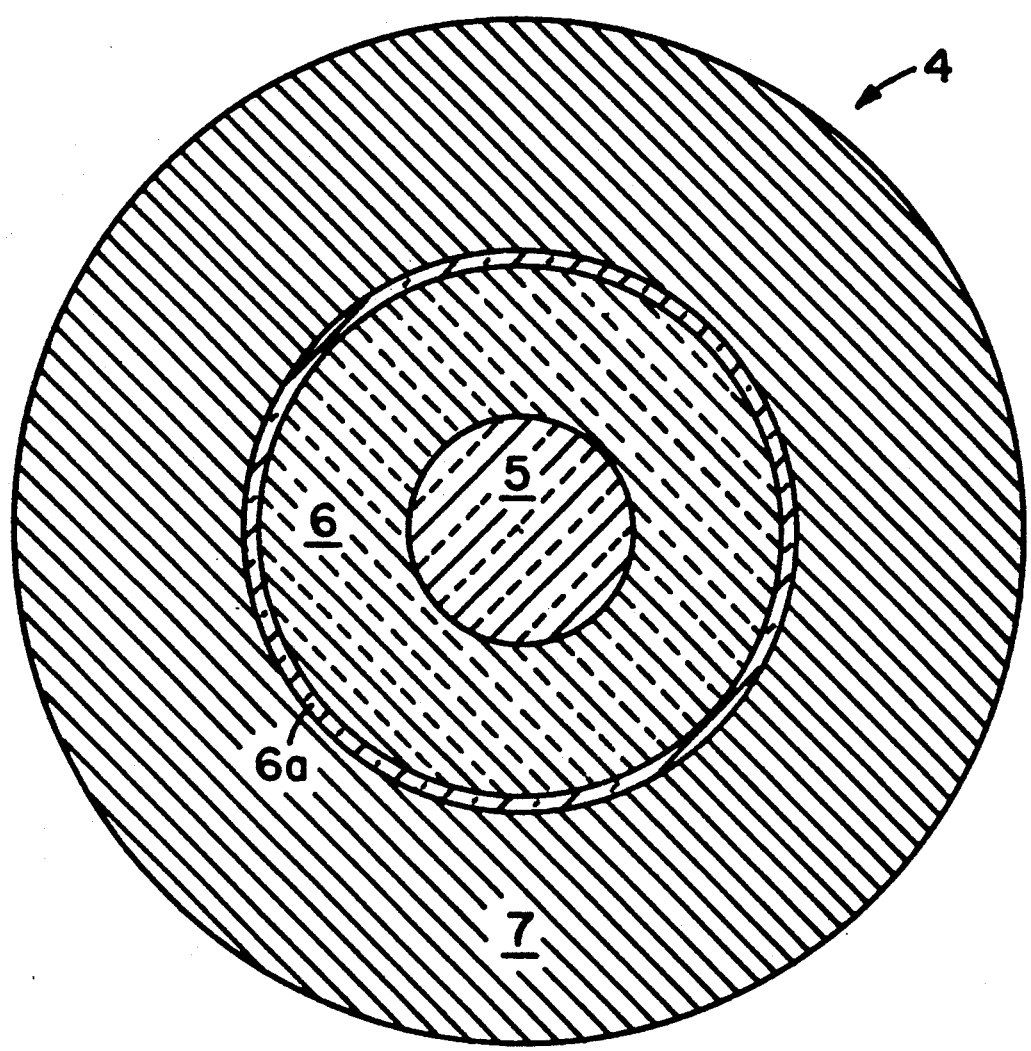

REDUCTION OF HYDROGEN GENERATION BY SILICONE-COATED OPTICAL FIBERS

FIELD OF THE INVENTION

The present invention relates to reducing the deleterious generation of hydrogen in cured, silicone-coated optical fibers.

BACKGROUND OF THE INVENTION

It is well known that optical fibers can be coated with protective organic coatings as the glass fibers are drawn from a glass melt or solid glass preform. Glass fibers, as drawn, exhibit very high tensile strength, but are substantially weakened by the development of flaws on the surface of the fiber. Thus, application of a protective coating to the surface of the fiber before it contacts any surface contaminants or solid surface can protect the inherent high strength of the fiber.

A number of different coating systems have been used commercially in the production of optical fibers for optical telecommunications. However, only two such systems are presently in widespread commercial use.

One system employs coating materials which are rapidly cured by exposure to ultraviolet light. Examples of such coatings are UV-curable urethane acrylates, such as those described in European Patent No. EP0204160. Ultraviolet-curable acrylate coating systems provide acceptable service over a relatively broad range of ambient temperatures. They are not, however, sufficiently stable to withstand elevated temperatures for prolonged periods of use.

Glass optical fibers have also utilized silicone polymer coating systems. Examples of such optical fibers include U.S. Pat. Nos. 4,765,713 to Matsuo et al., 4,848,869 to Urruti, 4,877,306 to Kar, and 4,962,996 to Cuellar et al. Generally, these products are prepared by coating optical fibers with silicone resin and then curing the coated fibers, usually at elevated temperatures and pressures. Curing causes a cross-linking reaction between —Si—CH=CH$_2$ and —Si—H groups to form —Si—CH$_2$—CH$_2$—Si— cross-links. This reaction is usually catalyzed by a hydrosilylation catalyst incorporated in the silicone polymer coating. See e.g., U.S. Pat. No. 4,689,248 to Traver et al.

One major problem encountered in optical fibers is the absorption of gaseous hydrogen. This gas can attenuate signals transmitted at wavelengths greater than 1 micron which are the wavelengths conventionally used in telecommunications. Hydrogen can also degrade the mechanical characteristics of optical fibers.

Hydrogen which contacts optical fibers can come from outside the cable by diffusion through the cable components. In addition, hydrogen is often generated by materials forming the cable which either have absorbed hydrogen during manufacturing or have decomposed during use. For example, hydrogen can form in metallic or plastic sheaths in plastic cores, in metallic armors, in silicone coatings, and in protective means for the optical fibers, (e.g., tubes loosely housing the optical fibers).

One particularly significant source of hydrogen in optical fiber cables are —Si—H groups present in the silicone coating. As discussed above, the objective of the curing step is to react such groups with —Si—CH=CH$_2$ groups to effect cross-linking. However, as cross-linking proceeds, the silicone polymer chains become locked into position, causing some —Si—H groups to become isolated from —Si—CH=CH$_2$ groups which they must react with. As a result, —Si—H groups remain in the silicone coating after curing is completed. Over time, such unreacted —Si—H groups generate deleterious quantities of hydrogen by what is believed to be the following catalyzed hydrolytic reaction:

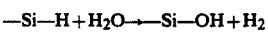

In addition, hydrogen can be further produced by the following reaction when —Si—OH groups are already formed.

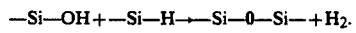

In commercial operations, the residual —Si—H groups remain in cured silicone coatings at levels which will produce 2000–3000 microliters of hydrogen per gram of silicone coating (measured with a gas chromatograph). Such levels of hydrogen are likely to cause the above-described signal attenuation and mechanical degradation problems. As a result, removal of residual —Si—H groups is highly desirable.

One approach to the hydrogen generation problem is to incorporate a hydrogen fixing filler in the optical cables, as disclosed by U.S. Pat. No. 4,688,889 to Pasini et al. Though such techniques may be effective, they significantly increase the weight and material costs of the resulting optical fiber product.

The more preferred approach is to prevent hydrogen from ever being formed by substantially eliminating —Si—H groups. Achievement of this has been attempted by increasing curing times and temperatures.

When curing time is increased, however, a mode unsuitable for commercial operations, residual —Si—H groups will still be present at levels sufficient to generate 500 microliters of hydrogen per gram of silicone coating. Such hydrogen levels are still too high, and such increased curing times necessitate use of longer, more expensive curing ovens.

If it is instead attempted to increase curing temperature to a level which substantially eliminates —Si—H groups, the silicone coating may burn or have its physical properties altered. This undesirable effect can only be prevented by use of a special low oxygen content atmosphere in the curing oven such as that taught by U.S. Pat. No. 4,679,899 to Kobayashi et al. The use of this technique is, however, undesirable due to the need for special gas handling systems.

As a result, the need for an economical procedure to reduce —Si—H groups in cured silicone-coated optical fibers continues to exist.

SUMMARY OF THE INVENTION

The present invention relates to the reduction of hydrogen generated by cured, silicone-coated optical fibers. Such optical fibers are prepared from cured silicone-coated, optical fibers by treating the fiber under conditions effective to convert —Si—H groups in the silicone coating to substituents which do not cause substantial hydrogen generation. In a preferred embodiment, the fiber is treated with one or more type of olefinic hydrocarbon, generally at elevated temperatures and pressures. The olefinic material converts —Si—H groups in the silicone coating to —Si—R groups where R is an alkyl group having the same number of carbon atoms as the one or more type of olefinic material. Although virtually any olefinic hydrocarbon can be utilized in this process, those with two to four carbon atoms are particularly preferred. Usually, this reaction is carried out in the presence of a hydrosilylation catalyst already in the optical fiber coating.

The present invention is also directed to optical fibers with reduced hydrogen generation capability that result from the above-described process. The structure of the fiber may generally include a light transmissive core, an inner cladding around the core, a silicone coating, and an outer cladding between the inner cladding and the silicone coating.

BRIEF DESCRIPTION OF THE DRAWING

The Figure is a schematic cross-sectional view of an optical fiber in accordance with the present invention.

DETAILED DESCRIPTION OF THE INVENTION

The present invention is directed to a process of reducing hydrogen generation by cured, silicone-coated optical fibers. The process involves providing a cured, silicone-coated optical fiber and treating that fiber with one or more type of olefinic hydrocarbon to convert —Si—H groups in the silicone coating to —Si—R groups where R is an alkyl group having the same number of carbon atoms as the one or more type of olefinic hydrocarbon. This process is usually carried out at elevated temperatures and pressures for a period of time sufficient to effect such conversion.

Elevated pressure is needed to permit penetration of the olefinic hydrocarbons through the multiple layers of the cured, silicone-coated optical fiber wound on a fiber reel. Generally, pressures of one atmosphere to 150 atmospheres, preferably 2 to 12 atmospheres, are utilized. However, if the number of layers of optical fiber are relatively few, lower operating pressures can be utilized.

Operating temperatures and reaction times are inversely related to each other. To decrease reaction time, a higher reaction temperature must be utilized and vice versa. Temperatures of 60° to 200° C., preferably 85° to 125° C., are useful. Generally, temperatures below 85° C. require reaction times of about 24 hours. On the other hand, reactions at 125° C. and 200° C. require reaction times of two hours and 0.5 hours, respectively.

Virtually any olefinic hydrocarbon or combination of them can be utilized in conjunction with the present invention. However, olefins with 2 to 10 carbon atoms are preferred, with those having 2 to 4 carbon atoms being more preferred, and ethylene being most preferred. Besides plain olefins, substituted olefins can be utilized in this process. Such materials include olefins with halogen; oxygen containing species such as alcohols, esters, ethers, keto or aldehydic groups; nitrogen containing species such as amino, cyano, or nitro groups; or other hetero substituents such as those containing silicon, sulfur, germanium, or tin.

The reaction of —Si—H groups with an olefinic hydrocarbon is preferably carried out in the presence of a hydrosilylation catalyst. Such catalysts include platinum, rhodium, ruthenium, palladium, osmium, Lewis bases such as tertiary amines, and irridium catalysts, and mixtures thereof. In prior art processes, such catalysts have been incorporated in the silicone coating to effect cross-linking between —Si—H groups and —Si—CH=CH$_2$ groups during preceding curing operations. See e.g., U.S. Pat. No. 4,689,248 to Traver et al. The presence of such catalysts in the silicone coating enables them to be used not only for the curing process but also for the subsequent step of reacting —Si—H groups with olefinic hydrocarbons in accordance with the present invention.

The cured, silicone-coated optical fibers produced by the process of the present invention have significantly fewer —Si—H groups than do the cured, prior art products. Cured, silicone-coated optical fibers treated with olefinic hydrocarbons in accordance with the present invention undergo a reduction in —Si—H groups to a point at which less than 350 microliters of hydrogen are generated per gram of silicone coating in order substantially to remove —Si—H groups completely from the coating. Usually, hydrogen generation by cured, silicone-coated optical fibers treated in this fashion is at a level 200 microliters of hydrogen per gram of silicone coating, preferably at a level below substantially equal to zero microliters of hydrogen per gram of silicone coating, in order substantially to remove —Si—H groups completely from the coating.

Another benefit of the process of the present invention is its effectiveness in hardening the silicone coating. Generally, the product of the present invention can be expected to have a Shore A surface hardness of 10 to 50, preferably 40.

An example of an optical fiber which can be treated by the process of the present invention is depicted in the Figure which is a schematic cross-sectional view of such an optical fiber 4. As shown in the Figure, optical fiber 4 includes core 5 which is surrounded by inner cladding 6 and outer cladding 6a. Surrounding the cladding layers is cured, silicone coating 7.

Core 5 is formed from a light transmissive material, such as glass or a polymer. Suitable glasses include quartz glass, optical glass, and other non-silicate glasses. Useful polymers are acrylates, methacrylates, polycarbonates, or other polymers with good optical properties.

The refractive index differential between core 5 and the inner cladding 6 combined with the precise dimensional control of the core provide an optical waveguide which guides optical signals within its made field which is substantially within the core. This result is achieved by forming inner cladding 6 from a glass or a polymer having a lower index of refraction than that of core 5. Suitable glasses include silicate glasses. Useful polymers comprise acrylates, methacrylates, polycarbonates, or silicones.

Optional outer cladding 6a is formed from a material with a high index of refraction (compared to that of core 5 and inner cladding 6) to isolate optically core 5 from silicone coating 7. Suitable materials for forming outer cladding 6a are disclosed in U.S. Pat. No. 4,877,306 to Kar which is hereby incorporated by reference.

The cured, silicone polymer coating 7 protects cladding layers 6 and 6a and core 5 from physical damage and high temperature deterioration. The silicone coating may be selected from among any of the silicone polymer materials known to have this utility. Most typically, these are two-package polymer systems which cure by silicon hydride addition to an alkene (commonly referred to as silicon hydride addition polymers) and is substantially free of inert liquid solvents or diluents (i.e., 100% solids systems). Examples of such polymer systems are the RTV (i.e., room temperature vulcanizing) silicones, e.g., those commercially available from the General Electric Company as RTV-615 and RTV-655 silicone polymers and from the Dow Corning Corporation as SYLGARD ® TM 184 and SYLGARD ® TM 182 silicone polymers.

Once this optical fiber cable has been formed and cured, as discussed in the Background of the Invention section, it is ready to be treated with one or more olefinic hydrocarbons in accordance with the present invention. Such treatment significantly reduces the amount of deleterious hydrogen generated by the silicone coating without increases in light attenuation or cracking of the coating due to increased Shore A hardness values. This treatment thus constitutes a substantial advance over coated optical fibers which are simply cured.

EXAMPLES

Example 1

Long lengths of glass optical fibers were coated with the different silicone coatings identified in Table 1 and then cured. Except for the use of different silicone coatings, fiber lengths, and the possible use of a Teflon ® (a trademark of E. I. DuPont de Nemours & Co., Wilmington, Del. for tetrafluoroethylene fluorocarbon polymers) coating over the silicone coating, as set forth in Table 1, the cured, coated fibers and their methods of production through the curing step were the same in this example for all fibers. Some portions of these fibers were then subjected to a gas chromatographic test to measure the amount of hydrogen generated in achieving substantially complete hydrogen removal from the silicone coating. Other parts of these coated optical fibers were contacted with ethylene at 85° C. and 11 atmospheres for 24 hours and subjected to the gas chromatographic test. The results of these tests for the different coated optical fibers is set forth below in Table 1.

TABLE 1

| SILICONE COATING | FIBER LENGTH | OUTER COATING | HYDROGEN GENERATION (µL H$_2$/g Coating) | |
|---|---|---|---|---|
| | | | Without Ethylene Treatment | With Ethylene Treatment |
| RTV615 | 1.5 km | Teflon | 1769 | 310 |
| SYLGARD ® 182 | 1.0 km | none | 1576 | 114 |
| SYLGARD ® 184 | 1.0 km | none | 1571 | 153 |

A comparison Of the hydrogen generation levels with and without ethylene treatment demonstrates that ethylene treatment significantly decreases the deleterious generation of hydrogen.

Example 2

Optical fibers made in accordance with Example 1, which were coated with RTV615 silicone and Teflon ®, were analyzed for signal attenuation (dB/km) with light at a variety of wavelengths This test procedure involved first passing such light through these cured, coated optical fibers which had not been treated with ethylene to obtain Untreated Initial Attenuation values, as set forth in Table 2. These fibers were then aged for 20 months and tested with light at the wavelengths previously used to obtain Untreated Aged Attenuation values as set forth in Table 2. The Untreated Differential Attenuation values (i.e. the difference between Untreated Aged Initial Attenuation and Untreated Initial Attenuation values) show that little change in attenuation occurs due to aging. The aged optical fibers were then treated with ethylene at 85° C. and 11 atmospheres for 24 hours and analyzed to obtain Treated Aged Attenuation values, as set forth in Table 2. By taking the difference between the Untreated Aged Attenuation and Treated Aged Attenuation values, Treated Differential Values, as set forth in Table 2 were obtained. Generally, the Treated Differential values show that the ethylene treatment causes little attenuation increase.

TABLE 2

| | No Ethylene Treatment | | | Ethylene Treatment | |
|---|---|---|---|---|---|
| Wave-length (nm) | Untreated Initial Attenuation (dB/km) | Untreated Aged Attenuation (dB/km) | Untreated Differential Attenuation (dB/km) | Treated Aged Attenuation (dB/km) | Treated Differential (dB/km) |
| 1060 | 1.59 | 1.62 | 0.03 | 3.78 | 2.16 |
| 1150 | 1.88 | 2.60 | 0.72 | 2.29 | −0.31 |
| 1200 | 1.00 | 1.99 | 0.99 | 0.47 | −1.52 |
| 1250 | 0.43 | 0.46 | 0.03 | 0.41 | −0.005 |
| 1300 | 0.37 | 0.40 | 0.03 | 0.36 | −0.04 |
| 1380 | 0.87 | 0.89 | 0.02 | 0.74 | −0.15 |
| 1500 | 0.24 | 0.27 | 0.03 | 0.27 | ±0.00 |
| 1550 | 0.23 | 0.27 | 0.04 | 0.34 | 0.07 |
| 1600 | — | 0.28 | — | 0.51 | 0.23 |

Example 3

The effectiveness of ethylene treatment was also analyzed by curing samples of the silicone materials set forth in Table 3 under the manufacturer's specified conditions. Without further treatment, some of each of these samples were then analyzed, in accordance with the procedure of Example 1, to measure the amount of hydrogen generation possible. Others of each of these samples were instead contacted with ethylene at 85° C. and 11 atmospheres for 24 hours and then analyzed, in accordance with the procedure of Example 1, to measure the amount of hydrogen generation possible. The results of these analyses, set forth in Table 3, show that ethylene treatment significantly reduces the hydrogen generation capability of these silicone materials.

TABLE 3

| | HYDROGEN GENERATION (µL H$_2$/g Coating) | |
|---|---|---|
| SILICONE MATERIAL | Untreated | Ethylene Treated |
| RTV615 | 2846 | 330 |

TABLE 3-continued

| SILICONE MATERIAL | HYDROGEN GENERATION (μL H₂/g Coating) | |
|---|---|---|
| | Untreated | Ethylene Treated |
| SYLGARD ® 182 | 2722 | 301 |
| SYLGARD ® 184 | 3018 | 137 |

Example 4

The effect of ethylene treatment on the hardness of cured silicone materials together with hydrogen generation capability was also analyzed. In this example, samples of RTV615 and SYLGARD® 184 silicones were cured at room temperature overnight. Samples of SYLGARD®182 were cured at 100° C. for 30 minutes, because SYLGARD® 182 is inhibited for greater pot life and would not cure overnight at room temperature. After taking initial Shore A hardness readings for samples of each cured silicone material (both without further treatment and with ethylene treatment at 85° C. and 11 atmospheres for 24 hours), as set forth in Tables 4 to 6, the samples were aged for 6 weeks at temperatures of 25° C., 100° C., 150° C., 200° C., and 225° C. The samples of RTV615 and SYLGARD® 184 that were aged at temperatures of 100° C. and above were initially cured at 100° C. for 30 minutes.

The untreated and ethylene treated samples were analyzed to measure the amount of hydrogen generated, pursuant to Example 1, and for Shore A hardness, as set forth in Tables 4 to 6. The Shore A hardness results of untreated RTV615 and SYLGARD® 184, which were cured at 25° C., indicate that these silicones continued to cure (i.e. cross-link) during aging. When ethylene treated, however, such samples did not increase in hardness. Tables 4 to 6 also show that thermal treatment again caused an increase in the Shore A hardness for untreated samples, while the treated samples remained unchanged up to 150° C. The large increase seen in Shore A hardness for samples aged at 200° C. and 225° C. was because of oxidative degradation of the materials which were aged in air. Large values for Shore A hardness indicate that the materials became brittle and lost their elastomeric properties. This effect is detrimental to their use as coatings for optical fibers. The hydrogen generation results in Tables 4, 5, and 6 demonstrate that ethylene treatment produces a material with a low initial residual hydrogen value which did not change again until thermal oxidation occurred (at or near 150° C. for Si—H bonds). However, for untreated samples, thermal aging below thermal oxidation temperature results in the generation of significantly higher levels of deleterious hydrogen.

TABLE 4

| | RTV615 SILICONE | | | |
|---|---|---|---|---|
| Thermal Aging Temperature (°C.) | SHORE A HARDNESS | | HYDROGEN GENERATION (μL H₂/g) | |
| | Untreated | Ethylene Treated | Untreated | Ethylene Treated |
| initial | 15 | 10 | — | — |
| 25 | 30 | 12 | 2074 | 205 |
| 100 | 56 | 44 | 679 | 199 |
| 150 | 56 | 44 | 169 | 186 |
| 200 | 83 | 77 | 8 | 8 |
| 225 | 88 | 88 | 8 | 7 |

TABLE 5

| | SYLGARD 182 | | | |
|---|---|---|---|---|
| Thermal Aging Temperature (°C.) | SHORE A HARDNESS | | HYDROGEN GENERATION (μL H₂/g) | |
| | Untreated | Ethylene Treated | Untreated | Ethylene Treated |
| initial | 38 | 40 | — | — |
| 25 | 42 | 40 | 1745 | 210 |
| 100 | 59 | 39 | 1053 | 159 |
| 150 | 60 | 38 | 232 | 5 |
| 200 | 97 | 93 | 0 | 0 |
| 225 | 98 | 98 | 0 | 0 |

TABLE 6

| | SYLGARD 184 | | | |
|---|---|---|---|---|
| Thermal Aging Temperature (°C.) | SHORE A HARDNESS | | HYDROGEN GENERATION (μL H₂/g) | |
| | Untreated | Ethylene Treated | Untreated | Ethylene Treated |
| initial | 26 | 24 | — | — |
| 25 | 41 | 24 | 1195 | 69 |
| 100 | 59 | 47 | 554 | 84 |
| 150 | 60 | 46 | 161 | 8 |
| 200 | 92 | 89 | 0 | 0 |
| 225 | 94 | 94 | 0 | 0 |

Although the invention has been described in detail for the purpose of illustration, it is understood that such detail is solely for that purpose, and variations can be made therein by those skilled in the art without departing from the spirit and scope of the invention which is defined by the following claims.

What is claimed:

1. A process of reducing hydrogen generation by a silicone-coated optical fiber, said process comprising:
    coating an optical fiber with a silicone composition;
    curing the silicone composition; and
    treating said cured, silicone-coated, optical fiber with one or more olefinic hydrocarbons under conditions effective to convert —Si—H groups in the silicone coating to —Si—R groups, wherein R is an alkyl group having the same number of carbon atoms as the one or more olefinic hydrocarbons.

2. A process according to claim 1, wherein said treating groups converts —Si—H groups to —Si—R groups to a level at which the cured silicone coating generates no more than 200 microliters of hydrogen per gram of silicone coating substantially to remove —Si—H groups completely from the silicone coating.

3. A process according to claim 1, wherein said treating is carried out int he presence of a hydrosilylation catalyst.

4. A process according to claim 3, wherein the catalyst is selected from the group consisting of platinum, rhodium, ruthenium, palladium, osmium, Lewis bases, and irridium catalysts, and mixtures thereof.

5. A process according to claim 3, wherein the catalyst is incorporated int he silicone coating of said optical fiber.

6. A process according to claim 1, wherein the one or more type of olefinic hydrocarbon has 2 to 10 carbon atoms.

7. A process according to claim 6, wherein the one or more type of olefinic hydrocarbon is ethylene.

8. A process according to claim 1, wherein said treating is carried out at a temperature of 60° to 200° C. and a pressure of 1 to 12 atmospheres.

9. A process according to claim 1, wherein said treating is under conditions effective to achieve a Shore A surface hardness of 10 to 50 in the treated, cured silicone-coated, optical fiber.

10. A process according to claim 1, wherein said cured, silicone-coated, optical fiber comprises:
a core formed from a light transmissive material;
an inner cladding surrounding and having a refractive index below that of said glass core; and
a cured, silicone coating around said inner cladding.

11. A process according to claim 10, wherein said cured, silicone coated, optical fiber further comprises:
a glass cladding between said inner glass cladding and said cured, silicone coating, wherein said outer cladding has a refractive index above that of said core and said inner cladding.

12. The product by the process of claim 7.

13. The product by the process of claim 1.

14. A process of forming a cured, silicone-coated, optical fiber with reduced hydrogen generation capability, said process comprising
providing an optical fiber comprising:
a core formed from a light transmissive material;
an inner cladding surrounding and having a refractive index below that of said glass core; and
a cured, silicone coating around said inner cladding, and
treating said cured, silicone-coated, optical fiber with ethylene at a temperature of 85° to 125° C. and at a pressure of 2 to 12 atmospheres in the presence of a platinum catalyst to convert —Si—H groups in the silicone coating to —Si—$CH_2CH_3$ groups, whereby said silicone coating generates no more than 200 microliters of hydrogen per gram of silicone coating substantially to remove —Si—H groups completely from the silicone coating.

15. A process according to claim 14, wherein said optical fiber further comprises:
an outer cladding between said inner cladding and said cured silicone coating, wherein said outer cladding has a refractive index above that of said core and said inner cladding.

* * * * *